United States Patent Office 3,474,005
Patented Oct. 21, 1969

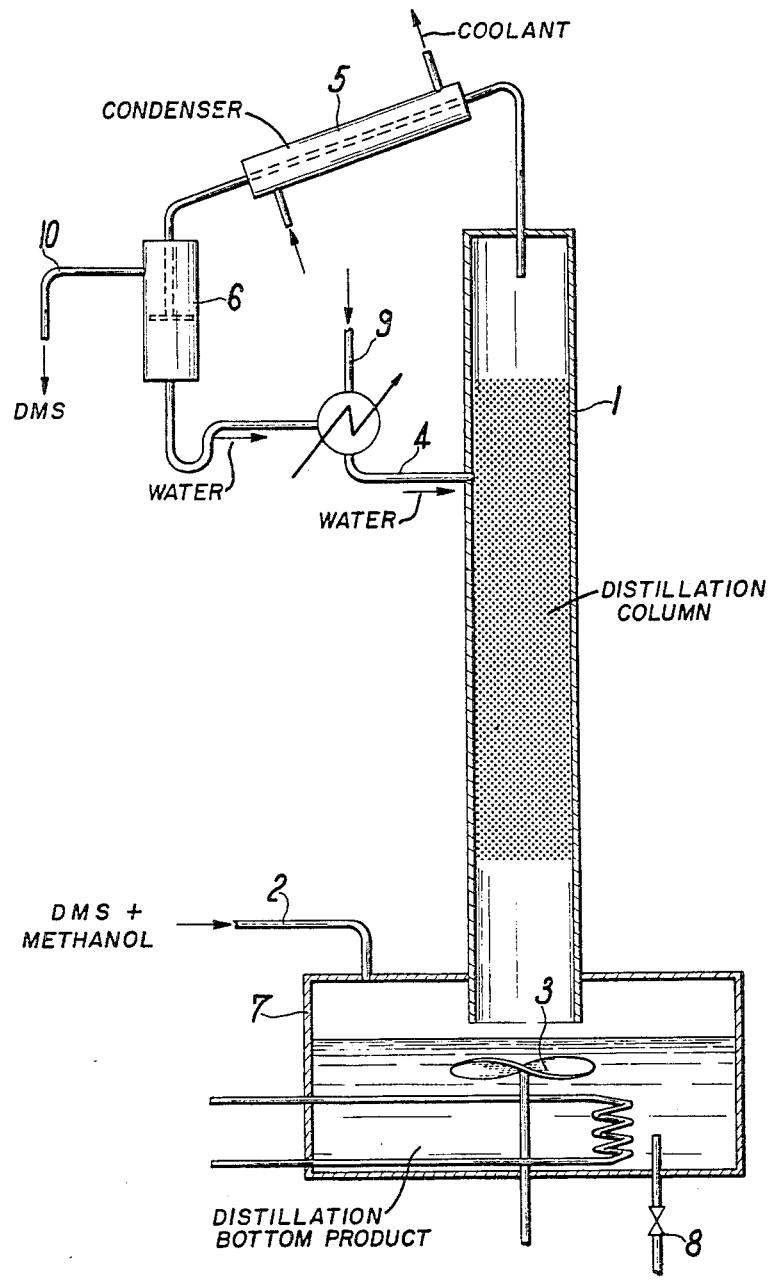

3,474,005
PROCESS FOR PURIFICATION OF DIMETHYL SULFIDE
Michel Biensan, Billiere, France, assignor to Societe Nationale des Petroles d'Aquitaine Tour d'Aquitaine, Courbevoie, France
Filed Dec. 18, 1967, Ser. No. 691,427
Claims priority, application France, Dec. 21, 1966, 88,329
Int. Cl. B01d 3/34, 3/40
U.S. Cl. 203—96     6 Claims

ABSTRACT OF THE DISCLOSURE

This invention relates to a process for the purification of dimethyl sulfide and, more particularly, to such a process using extractive distillation, wherein water is injected into a column through which flows distilled vapors of a mixture of dimethyl sulfide with methanol and water.

Background of the invention

Dimethyl sulfide, which is referred to by the abbreviation DMS, is generally prepared from methanol and $H_2S$, but it can also be obtained as a by-product of the synthesis of methyl mercaptan. In both cases, the reaction mixture contains methanol and water, and its distillation leads to a DMS-methanol azeotrope containing 10% of methanol. The presence of methanol in DMS is frequently a nuisance, particularly during the oxidation of DMS to dimethyl sulphoxide, during which the methanol is oxidized into formaldehyde; it is, therefore, necessary to separate the methanol from the DMS before this operation.

An article by H. Prückner, published in the German journal "Erdöl and Kohle" (Publishers, Industrie-Verlag von Hernhaussen), on pages 188 to 192 of volume 16, Number 3, March 1963 and, more particularly in fig. 1, page 189, shows that it is possible to separate a $CH_3OH$-DMS mixture by washing with water, the methanol being retained by the water.

French patent specification No. 1,161,066 discloses that the injection of steam into the upper part of the fractionation apparatus causes the separation of methanol from methyl mercaptan to an appreciable degree.

Nevertheless, it is necessary constantly to check the rate at which the product is discharged in order to supervise the purity thereof and to try to improve it. These and other difficulties experienced with the prior art devices have been obviated in a novel manner by the present invention.

It is, therefore, an outstanding object of the invention to provide a process for the efficient separation of dimethyl sulfide from a mixture thereof with methanol.

Another object of this invention is the provision of a method for the separation of dimethyl sulfide leading to a product of very high purity.

A further object of the present invention is the provision of a process of the type described, which process can be carried on without the necessity of constantly checking its progress.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

Summary of the invention

The present invention relates to a process for purifying dimethyl sulfide by the extractive distillation of a mixture of this substance with methanol and water, in which water is injected into the dimethyl sulfide vapor and methanol vapor which distil, the temperature of the water being the same as that of the said vapors at the point at which the water is injected. The distillation is carried out in a column, the water being injected at a certain level in the column and being at the same temperature as the temperature of the vapors at this level.

Distillation is carried out in such a way that the amount of methanol in the residue from the distillation is below 40% and preferably between 30 and 35%; that is to say, the supply of the water for injection purposes is so regulated that the methanol at the bottom of the column is always in a form in which it is diluted to below 40%, and preferably to between 30 and 35%.

The invention is also concerned with the temperature of the reboiler which, at atmospheric pressure, is kept above 60° C. and preferably in the region of 75° C. In carrying out the process according to the invention, the reflux ratio during distillation can vary, for example, from 0:1 to 10:1, but it is preferably nil or very small.

Brief description of the drawing

The character of the invention, however, may be best understood by reference to one of its structural forms, as illustrated by the accompanying drawing, in which:

The single figure of drawings shows apparatus incorporating the principles of the present invention.

Description of the preferred embodiment

The apparatus shown in the drawing consists of a distillation column 1 arranged to operate continuously. Crude DMS is introduced through a pipe 2 into a reboiler 7. This reboiler is equipped with a stirring device 3. Water is supplied through a conduit 9 and passes by way of a pipe 4 into the upper part of the column. The apparatus includes a condenser 5 at the outlet end of which DMS is delivered into a decanting chamber 6, at the base of which entrained water is collected and returned to the column after heating; the DMS is collected by means of a pipe 10. The distillation bottoms product or residue, consisting of an aqueous solution of methanol, is drawn off through a conduit 8 at the bottom of the reboiler 7.

The distillation tests referred to below were carried out in such a column, the dimensions of which were:

|  | Mm. |
|---|---|
| Internal diameter | 25 |
| Height | 1500 |

The volume of the reboiler was 500 ml.

The crude DMS used in these tests, freed from the major part of the $CH_3SH$ which it could contain, had the following composition by weight:

| | Percent |
|---|---|
| DMS | 50.4±0.6 |
| $CH_3OH$ | 47.3±0.8 |
| $CH_3SH$ | 0.03 |
| $H_2O$ | 2.0±0.2 |

Measurements of the concentration of methanol in the residue and the influence of this concentration on the purity of the DMS are shown in the following table. The working conditions were such that the reflux was nil, the temperature of the reboiler was 75° C. and the supply of water was 240 ml./h.

TABLE 1

| Percent of methanol in the residue | Percent of methanol in the DMS obtained | Losses of DMS |
| --- | --- | --- |
| 17.6 | Traces | 0.6 |
| 34.6 | do | 0.8 |
| 39.7 | 0.1 | 1.2 |
| 69.6 | 0.9 | 1.9 |

It will be seen from this table that, with the increases in the proportion of methanol in the residue, the losses of DMS are also increased and that when the methanol concentration in the residue exceeds 40%, the loss of DMS reaches a level which cannot be ignored. Concurrently, the purity of the DMS decreases.

On the other hand, it is desirable to work with the highest possible methanol concentration, because this leads to a smaller consumption of washing water. Thus, less energy is necessary to bring this water to the temperature at which it is introduced and, in addition, the dimensions of the installation are smaller and the amount of heat which has to be supplied to the reboiler is also less.

The best possible concentration of methanol in the residue is in the region of 30 to 35%, and in the particular case considered, for a DMS-methanol solution with 47% of methanol, this corresponds to a rate of crude DMS of 250 ml./h. for a supply of water of 240 ml./h. The ratio between the supplies is thus approximately 1:1.

In addition, to the influence which the methanol concentration of the residue has, the reflux and the temperature of the reboiler may also have a certain influence on the quantity of DMS collected.

Tests were carried out in the same installation in order to study the influence of the reflux. The operating conditions were as follows: temperature of the reboiler 70° C., rate of supply of water 240 ml./h., rate of DMS 100 ml./h.; that is to say, water was supplied at the rate of 2.4 volumes per volume of DMS. The following results were obtained:

TABLE II

| Amount of reflux | Percent of CH³OH in the DMS | Losses of DMS, percent |
| --- | --- | --- |
| 0 | Traces | 0.6 |
| 3.5 | do | 0.5 |
| 9.7 | 0.95 | 0.5 |

Table II shows how the increase in the amount of reflux tends to lower the purity of the DMS which is obtained. This is explained by the fact that the greater the reflux, the more DMS there is sent into the reboiler and, as a consequence, there is more methanol entrained in the column in azeotropic form.

The influence of the temperature of the reboiler was studied. The working conditions are: rate of supply of water 240 ml./h., rate of supply of DMS 250 ml./h., reflux nil. Operating at atmospheric pressure, the following results were obtained.

TABLE III

| Temperature of the reboiler, ° C. | Percent CH³OH in the DMS | Losses of DMS, percent |
| --- | --- | --- |
| 55 | Traces | 2.5 |
| 60 | do | 1.9 |
| 65 | do | 1.3 |
| 70 | do | 0.6 |
| 75 | do | 0.3 |

Thus, raising the temperature of the reboiler results in a reduction in the loss of DMS, without the purity of the DMS obtained being reduced. Nevertheless, the temperature of the boiler is generally below the boiling point of the water-methanol solution. For a concentration of 30% of methanol, this temperature is 78.5° C. The temperature of 75° C. thus seems to be suitable. The best operating conditions at atmospheric pressure are:

amount of reflux=nil
percent of methanol in the residue=30%
temperature of the reboiler=75° C.

Under these conditions, DMS is collected with a yield of 99.7% and is practically pure:

|  | Percent |
| --- | --- |
| DMS | 99.6 |
| Water | 0.4 |
| $CH_3OH$ | Traces |
| $CH_3SH$ | Traces |

A single passage over calcium chloride is sufficient to remove the remaining water. There is then obtained a product having the following characteristics:

| $BP_{760}$, ° C. | 37 |
| --- | --- |
| $n_D^{20}$ | 1.4365 |
| $d_4^{20}$ | 0.847 | content of $CH_3OH$ smaller than 100 p.p.m.
content of water smaller than 90 p.p.m.
content of $CH_3SH$ smaller than 300 p.p.m.
ash smaller than 20 p.p.m.
purity higher than 99.8%

It will be obvious that the invention is not limited to the examples described, and that it is capable of numerous variations, depending on the applications envisaged, without thereby departing from the scope of the invention as defined by the appended claims. Thus, for example, it is possible to operate under elevated pressure or under reduced pressure. The working temperature will then be between the boiling point of DMS and that of the aqueous methanol solution at the pressure at which the operation is taking place, and preferably in the upper temperature range.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A process for the separation of dimethyl sulfide from a mixture thereof with methanol and water, comprising the steps of:
    (a) supplying a mixture of dimethyl sulfide and methanol to a reboiler at a given volume rate;
    (b) extractively distilling the mixture to obtain a vapor while recovering a distillation bottoms product;
    (c) passing the vapor vertically through a distillation column;
    (d) injecting water into the current of vapor in the upper part of the column at the rate of about 1 volume of water per 1 volume of dimethyl sulfide, the water thus injected being maintained at a temperature which is substantially the same as the temperature of the vapor at the same level;
    (e) removing substantially all of the methanol as the bottoms product; and
    (f) condensing and recovering the overhead as a highly enriched dimethyl sulfide fraction.

2. The process as recited in claim 1, wherein the amount of methanol in the distillation bottoms product is in the range from about 30 to 35% by weight.

3. The process as recited in claim 2, wherein the reboiler is maintained at a temperature which is between the boiling point of dimethyl sulfide and that of the distillation bottoms product at the pressure in the reboiler.

4. The process as recited in claim 3, wherein the temperature of the reboiler at atmospheric pressure is maintained above 60° C. and below the boiling point of the distillation bottoms product.

5. The process as recited in claim 4, wherein the temperature in the reboiler is maintained at about 75° C.

6. The process as recited in claim 4, wherein the reflux ratio of the distillation is maintained in the range from 0:1 to 10:1.

References Cited
UNITED STATES PATENTS
2,816,146 10/1957 Doumani.
2,930,816 3/1960 Dickey.

OTHER REFERENCES
Weissberger: Techniques of Organic Chemistry, p. 338, 1951, New York.

Prucker: Erdol and Kohle, Germany, vol. 16, No. 3, March 1963, pp. 188–192.

WILBUR L. BASCOMB, JR., Primary Examiner

U.S. Cl. X.R.

202—175; 260—609